G. WORTHINGTON.
APPARATUS FOR OBSERVING MOVING PICTURES.
APPLICATION FILED MAR. 26, 1917.

1,261,886.

Patented Apr. 9, 1918.

Witnesses.
Porter H. Plauth,
A. G. Donigan

Inventor
George Worthington
By Tatum & Samuels
Attorney

UNITED STATES PATENT OFFICE.

GEORGE WORTHINGTON, OF LAWYERS HILL, MARYLAND.

APPARATUS FOR OBSERVING MOVING PICTURES.

1,261,886.  Specification of Letters Patent.  Patented Apr. 9, 1918.

Application filed March 26, 1917. Serial No. 157,294.

*To all whom it may concern:*

Be it known that I, GEORGE WORTHINGTON, a citizen of the United States of America, residing at Lawyers Hill, Howard county, State of Maryland, have invented certain new and useful Improvements in Apparatus for Observing Moving Pictures, of which the following is a specification.

This invention relates to an instrument for observing moving pictures, the object being to produce at a small cost a device by which anybody possessing a collection of motion portraits of his friends or of familiar scenes or happenings may view them in a satisfactory manner without the use of the usual projecting apparatus.

Another possible use of the present apparatus is that of a child's toy. A simplified form of the apparatus can be made available to the majority of children in this way. Such a toy may be used with either stereoscopic or single bands or films and these may be either photographs or sketches, as cartoons.

In the apparatus embodying my invention, I use the ordinary moving picture film or any strip or band having a series of pictures of a moving object in successive positions, the same being of course made to fit the machine. This strip or band has an opaque portion with apertures or shutter openings, one or two corresponding to each picture, through which the pictures, or in the apparatus shown, more properly their images, are seen as they pass the line of vision giving an effect of motion similar to that produced on the screen by the regular moving picture apparatus.

Preferably, the pictures on the moving strip or film are in pairs taken by a stereoscopic camera and the observing apparatus is divided centrally separating the field of vision and likewise separating the views or pictures of each pair and the shutter openings in the moving film or band. The picture strip is led over a suitable sight opening which may have two lenses, one for each eye, or may be left open, the lenses being merely to focus the rays and magnify and secure added brilliancy of the image. Opposite the sight opening is a mirror, or in the stereoscopic form, two mirrors, one opposite each shutter opening in the position which it occupies when opposite the sight opening so that as each view or pair of views with its shutter opening or pair of shutter openings passes the sight opening, each view is reflected in the corresponding mirror, the rays being projected into the corresponding eye of the observer and if lenses are used focused by the corresponding lens, the effect of a motion picture being thus conveyed. In the stereoscopic form, the projection of the rays from each picture of a pair into the corresponding eye of the observer, gives the observer the combined effect of the two views with the desired relief, in substantially the same manner as the two views of the ordinary stereoscopic photograph are combined through the usual stereoscopic device.

The shutter effect of the apertures in the strip serves to limit the observation of each view to a single glimpse, as it passes the line of vision, eliminating the harmful vibration which is so well-known in connection with the ordinary moving picture apparatus. This shutter effect may be utilized entirely independently of the stereoscopic feature if desired.

An instrument embodying combined elements corresponding to the various features of my invention is illustrated in the accompanying drawings, in which Figure 1 is a vertical, central section;

Figures 1, 2:
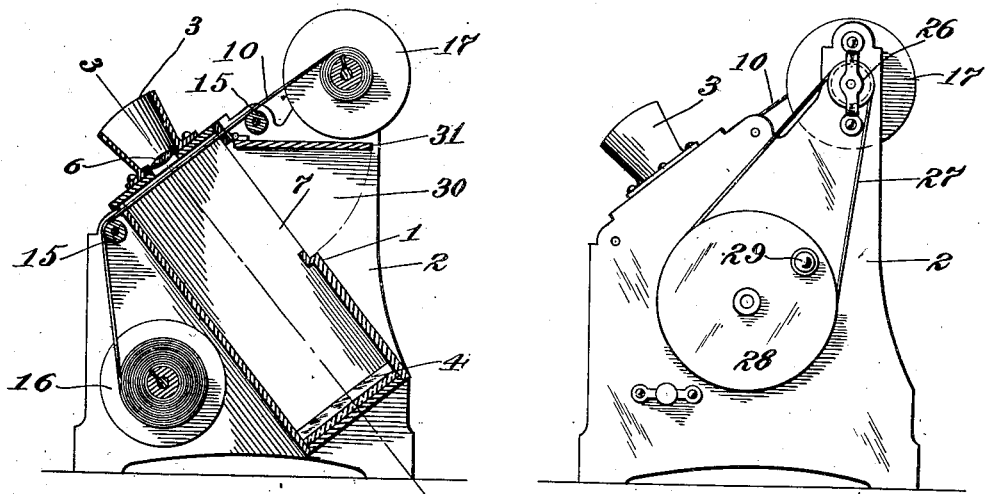
Fig. 2 is a side elevation.
Figures 4, 5:
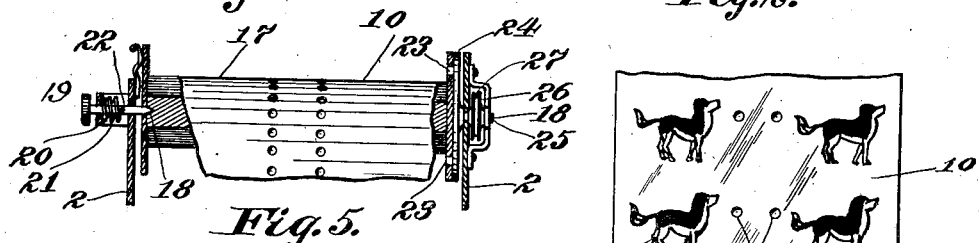
Fig. 4 illustrates a section of film.
Fig. 5 is a detail view.
Figure 3:
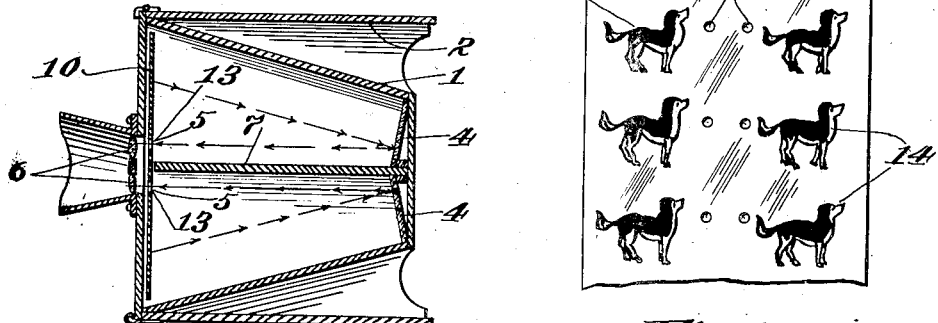
Fig. 3 is a section on the line 3, 3 of Fig. 1.

Referring to the drawings by numerals, each of which is used to indicate the same or similar parts in the different figures, the instrument consists of a casing 1, shown as triangular or trapezoidal in cross-section, the same being supported in a rectangular frame 2. The trapezoidal casing 1, in the form of the invention shown, is provided at one end with a sight opening 3. This is placed centrally of the longer end of the trapezoid. At the opposite end are mirrors 4, either one or two, depending on whether the apparatus is to be stereoscopic or single. In the stereoscopic form, as shown, there are two mirrors inclined outward so that rays from predetermined points 5, equidistant on each side of the sight opening 3, will be projected each from the corresponding mirror through the sight opening on each side of the center. The sight opening is preferably made of a width to permit the observer to use both eyes in viewing the pictures and in the more expensive form of the apparatus, the rays coming from the mirror or mirrors 4 are focused and the views magnified if desired by means of one or two lenses 6 depending on whether the apparatus is single or stereoscopic, though the lenses may be omitted and the images on the mirror observed direct unless it is desired to magnify the views or increase the brilliancy of the images by focusing. In the stereoscopic form, a central partition 7 separates the field of vision of the two eyes of the observer and likewise separates the views or pictures of each pair and the shutter openings in the moving film or band. There is also an opening for the admission of light at 30 which may have a hinged cover 31.

The picture strip 10 has one or two shutter openings 13 opposite each view 14 and preferably the views 14 are made in stereoscopic pairs and the shutter openings 13 corresponding to each pair of views are two in number, spaced apart by a distance corresponding to the average distance spacing the pupils of the human eye. This film or strip 10 is led in front of the sight opening 3 over idler rollers 15 and wound on and off of film rollers 16 and 17. In the form of the invention illustrated, each of the rollers or spools 16 and 17 is provided at each end with a central countersink or pivot bearing 18 to be engaged by spring pressed pins 19 which may be arranged as shown with a U-shaped band 20 fastened to the outside of the frame and furnishing a bearing for the pin and an abutment for a spring 21 encircling the pin 19 and bearing against the cross-pin or a shoulder 22 on that pin. One end of each spool is also provided, in the form of the invention shown, with a series of holes 23, preferably distributed on an equal radius about the center 18. These are to receive corresponding pins on a disk 24 mounted on a stud 25 in suitable bearings in the frame and in alinement with the upper pin 19 which carries the roller 17, see Fig. 1. This stud or shaft 25 also carries a pulley 26 on the outside of the frame which is engaged by a cord, belt, chain or the like 27, passing over a pulley 28 pivoted on the outside of the frame and turned by a suitable handle or crank 29 to be manually engaged. It is of course understood that any suitable gearing may be substituted for the kind illustrated and described. The rollers in their upper position are intended to have sufficient clearance to permit the insertion of the bands and the spring pin 19 has sufficient play to permit it to be withdrawn for the insertion of the spool, and when released, to be advanced by the pressure of the spring sufficiently to hold the roller in position and prevent the pins from slipping from their openings 23.

By turning the crank 29, the gearing is operated turning the roller 17 and drawing the film across the sight opening. As each view 14 passes the sight opening, the corresponding shutter holes 13 also pass the sight opening, giving the eyes an instantaneous glimpse of the reflection of the view in the mirror, and where the stereoscopic principle is employed and there are two views, each view 14 is reflected in the corresponding mirror and the reflection is seen through the corresponding sight opening. In this way the reflection from each pair of views is received by the corresponding eye of the observer, and the views being of a stereoscopic nature are combined giving the desired relief effect.

The function of the sight openings 13 is to give the observer an instantaneous glimpse only of the moving film as each view passes the line of vision so that the waving or vibrating effect is avoided, the successive pictures being seen in a single position only.

It has been made apparent that some of the important features of this invention, particularly the use of shutter openings in the film, may be applied to apparatus not embodying the stereoscopic principle.

In order that the nature and operation of my invention and its application may be fully understood, I have described specifically and in detail the construction and operation of an instrument for observing moving picture strips or films and a specific form of which combined with the apparatus is believed to be in itself novel; however, the specific terms herein are used descriptively rather than in their limiting sense and the scope of the invention is defined in the claims.

I claim—

1. In combination, a picture strip having successive views of a moving object, a shutter opening in the strip corresponding to each view, a mirror, and means for moving the strip by the mirror to project the rays from each view successively through the corresponding shutter openings as the view passes the mirror.

2. In combination, a picture strip having successive views of a moving object, a shutter opening corresponding to each view, means for moving the strip, passing a portion of it through a fixed plane, and a mirror inclined to the plane and arranged to project the rays from each view successively through the corresponding shutter openings as the view passes the mirror.

3. In combination, a picture strip having successive views of a moving object, a shutter opening corresponding to each view, means for moving the strip, passing a portion of it through a fixed plane, a mirror inclined to the plane and arranged to project the rays from each view successively through the corresponding shutter openings as the view passes the mirror, and means for directing light on to the picture.

4. A moving picture strip composed of opaque material containing a series of views of moving objects in successive positions, the strip having a shutter opening corresponding to each view.

5. A moving picture strip having a series of views of a moving object in successive positions, the views being in pairs stereoscopically related and having two shutter openings spaced apart by a distance equal to that spacing the human eyes, corresponding to each view.

6. In combination a moving picture device comprising a casing, a sight opening, a central partition dividing the sight opening, a moving picture strip having a series of views of a moving object in successive positions, the views being in pairs stereoscopically related, two shutter openings to each pair of views, the shutter openings being spaced by a distance corresponding to the distance apart of the human eyes, means for moving the strip over the sight opening and a reflector extending on each side of the partition adapted to project the rays from each view of each pair through the corresponding shutter opening into the eye of the observer on the corresponding side of the partition.

7. In combination a moving picture device comprising a casing, a sight opening, a central partition dividing the sight opening, a moving picture strip having a series of views of a moving object in successive positions, the views being in pairs stereoscopically related, two shutter openings to each pair of views, the shutter openings being spaced by a distance corresponding to the distance apart of the human eyes, means for moving the strip over the sight opening and a reflector extending on each side of the partition adapted to project the rays from each view of each pair through the corresponding shutter opening into the eye of the observer on the corresponding side of the partition, and means for admitting light to the pictures.

8. In combination, a casing having a sight opening, a picture strip having successive views of moving objects, a shutter opening in the strip corresponding to each view, means for moving the strip and passing it over the sight opening, and a mirror to project the rays from each view successively through the corresponding shutter opening as it passes the sight opening.

Signed by me at Baltimore, Maryland, this 20th day of March, 1917.

GEORGE WORTHINGTON.

Witnesses:
ALICE G. DONEGAN,
ZELLA KUHN.